(12) United States Patent
Morin

(10) Patent No.: US 7,637,704 B2
(45) Date of Patent: Dec. 29, 2009

(54) RAILCAR CONTAINER LOCK PROVIDING AUTOMATIC LOCKING AND UNLOCKING

(75) Inventor: Andrew J. Morin, Mokena, IL (US)

(73) Assignee: Portec Rail Products Inc., Pittsburgh, PA (US)

( * ) Notice: Subject to any disclaimer, the term of this patent is extended or adjusted under 35 U.S.C. 154(b) by 454 days.

(21) Appl. No.: 11/622,281

(22) Filed: Jan. 11, 2007

(65) Prior Publication Data

US 2008/0170924 A1   Jul. 17, 2008

(51) Int. Cl.
*B60P 7/13* (2006.01)

(52) U.S. Cl. .......................................... 410/69; 410/76

(58) Field of Classification Search .................. 410/77, 410/80, 81, 82, 84, 90, 91, 69–73, 76, 78; 292/121, 128, 219, 228, 95, 101, 102, 108, 292/109
See application file for complete search history.

(56) References Cited

U.S. PATENT DOCUMENTS

| | | | | |
|---|---|---|---|---|
| 1,649,598 A | * | 11/1927 | Kirchner | 410/79 |
| 3,774,551 A | | 11/1973 | Sweger | |
| 4,239,260 A | * | 12/1980 | Hollowell | 280/806 |
| 4,372,715 A | * | 2/1983 | Naffa | 410/79 |
| 4,382,735 A | * | 5/1983 | Synowiec | 410/70 |
| 4,430,032 A | * | 2/1984 | Morgan | 410/68 |
| 5,106,247 A | * | 4/1992 | Hove et al. | 410/73 |
| 5,570,981 A | | 11/1996 | Brewster | |
| 5,613,814 A | * | 3/1997 | Jackson | 410/70 |
| 5,782,511 A | * | 7/1998 | Schwarz | 292/219 |
| 6,565,299 B1 | * | 5/2003 | Guilbault et al. | 410/69 |
| 6,695,553 B1 | * | 2/2004 | Galbreath et al. | 410/80 |
| 6,974,164 B2 | * | 12/2005 | Brewster | 292/109 |
| 7,114,898 B2 | * | 10/2006 | Brewster | 410/70 |

OTHER PUBLICATIONS

The Holland Low-Profile (LP) Automatic Container Lock (undated).
Holland Low-Profile Automatic Container Lock Sketch (undated).
Sketch Container Lock II—1998.

* cited by examiner

*Primary Examiner*—Patricia L Engle
(74) *Attorney, Agent, or Firm*—Schiff Hardin LLP

(57) ABSTRACT

In a container lock for insertion into a locking aperture, a post is provided insertable into and extractable from the locking aperture. At least one latch arm is provided within the post and which projects laterally from a side of the post. The latch arm is pivotable about a first pivot axis during insertion and about a second pivot axis spaced from the first pivot axis during at least a beginning of extraction. A compression spring is positioned to bias the at least one latch arm.

18 Claims, 6 Drawing Sheets

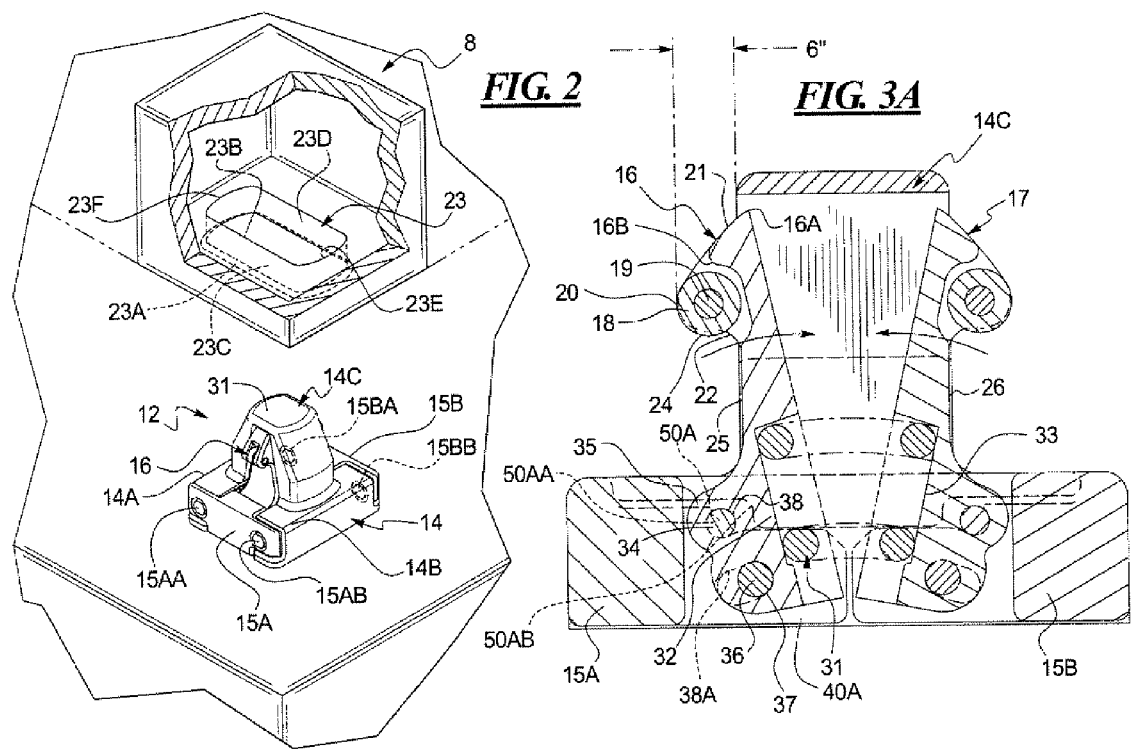

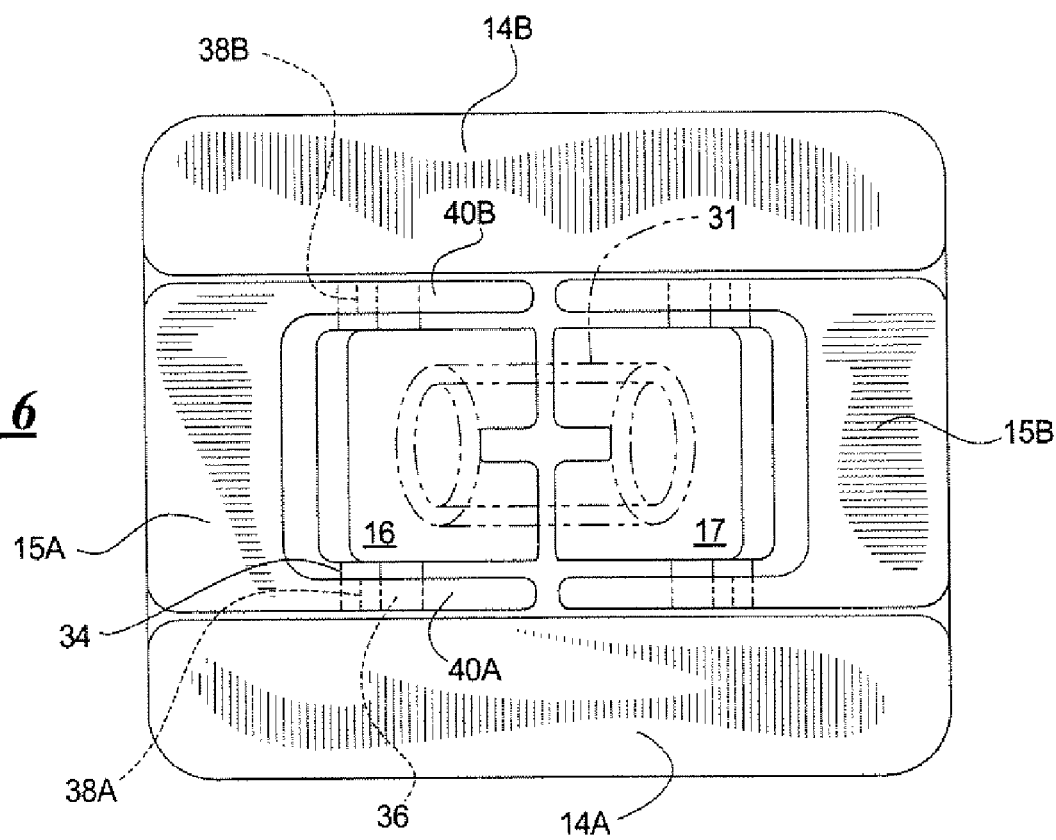

RAILCAR CONTAINER LOCK PROVIDING AUTOMATIC LOCKING AND UNLOCKING

BACKGROUND

The present preferred embodiment relates to the field of locking containers on load carrying platforms, such as on a railcar.

Association of American Railroads Specification M-952 spells out requirements for intermodal container securement devices with automatic latching and unlatching. Chief among these requirements are: 1) the downward force required to allow the container corner casting to engage the container lock; and 2) the upward force which must be attained before the container corner casting is allowed to disengage the container lock. Specifically, the engagement or latching force is 800 lbs. maximum and the disengagement or unlatching force must be between 1,600 and 2,200 lbs. Another requirement is that the physical engagement of the latching device into a locking aperture of the container corner fitting be not less than ¾" under the most adverse conditions.

Latch type container locks as described in U.S. Pat. No. 5,570,981, and others, incorporate a single latch. The vertical post of the container lock is designed to allow a ¼" lateral clearance between the post and a back corner edge of the locking aperture in the corner casting. Therefore, to maintain the ¾" minimum lateral physical engagement that the latch must make with the locking aperture of the corner casting, the latch must laterally protrude at least ¾" plus ¼" or a total of 1". Described in another way, the 1600-2200 lbs. disengagement force (600 lb range must occur when displacing the latch at least ¾" laterally, or under worst conditions, 1". As an example, the 1" lateral travel could occur at 2200 lbs of force, equating to a spring rate of 2200 lbs/in. That same spring at ¾" travel requires a force of ¾ times 2200 or 1650 lbs. Typical spring rate tolerances are +/−10% or +/−220 lbs (440 lbs total which is 73% of the 600 lb range). The tolerance acceptable on this spring would be a total of 50 lbs, or 25 divided by 2200 equals +/−1.1%. Not only does the force have to be repeatable but the design must also include any force due to sliding friction Therefore previous working prior art designs generally incorporated two separate springs, one each for the insertion and extraction operations respectively.

SUMMARY

It is an object to provide a latch type container lock which improves over the prior art discussed above.

In a container lock for insertion into a locking aperture, a post is provided insertable into and extractable from the locking aperture. At least one latch arm is provided within the post and which projects laterally from a side of the post. The latch arm is pivotable about a first pivot axis during insertion and about a second pivot axis spaced from the first pivot axis during extraction. A compression spring is positioned to bias the at least one latch arm. Changing from the first pivot axis to the second alters a mechanical linkage in such a way that force developed in the spring acts through a substantially larger lever arm during extraction than it does during insertion.

BRIEF DESCRIPTION OF THE DRAWINGS

FIG. 2 is a perspective view of the container lock of the preferred embodiment along with a corner casting of a container prior to insertion of a post of the container lock into a locking aperture of the corner casting;

FIG. 3A is a sectional view taken along line III-III in FIG. 5 of the container lock;

FIG. 6 is a bottom view of the container lock.

DESCRIPTION OF THE PREFERRED EMBODIMENT

Figure 1:
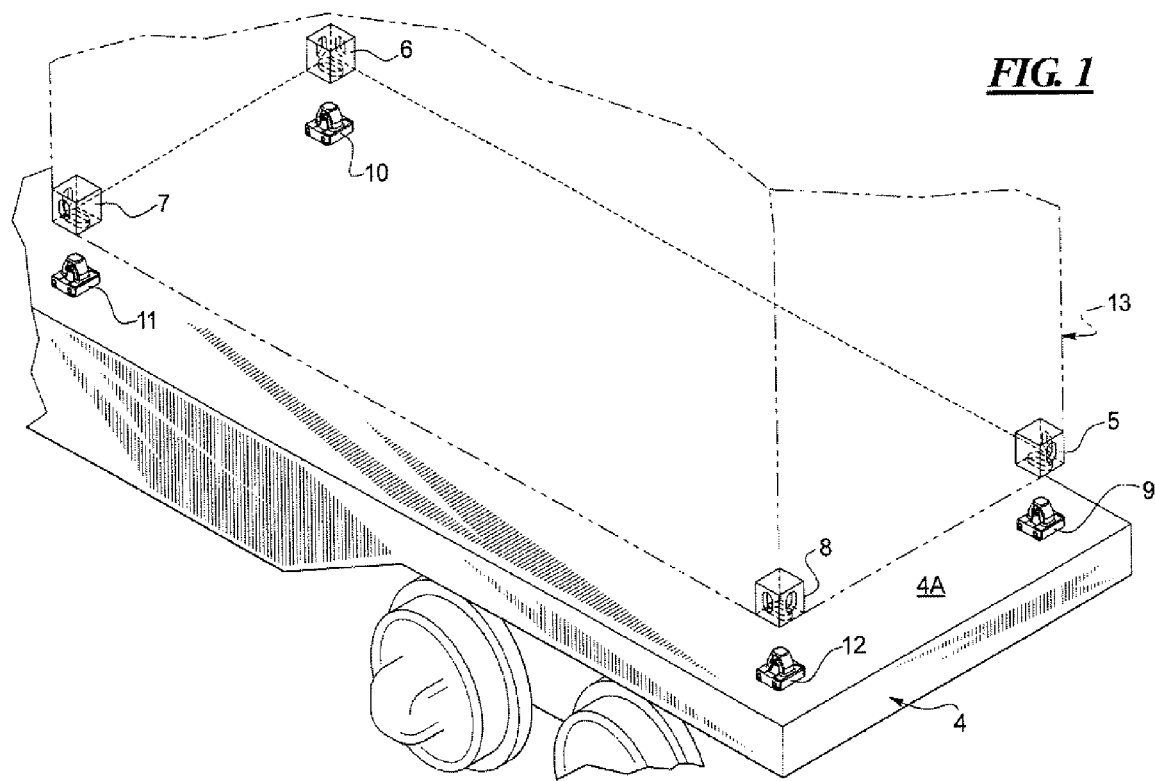
FIG. 1 is a perspective view of a container prior to being loaded down into engagement with respective container locks on a loading platform of a railcar.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

As shown in FIG. 1, a load platform 4A such as of a railcar 4 has four container locks 9, 10, 11 and 12 mounted on the platform 4A. A container 13 has corresponding corner castings 5, 6, 7 and 8 each having a respective locking aperture for receiving a respective latching mechanism of the respective container locks.

One of the container locks 12 along with its respective corner casting receptacle 8 positioned thereabove are shown in FIG. 2. The container lock 12 has a base 14 formed of end portions 14A, 14B and an integral arch-shaped insertion post 14C forming an arch between the base end portions 14A and 14B. Side pieces 15A and 15B are bolted to the end portions 14A and 14B by respective bolts 15AA, 15AB, 15BA, and 15BB.

Within the arch-shaped insertion post 14C at both sides thereof are located first and second spring loaded latch arms 16 and 17 (see also FIG. 3A). The latch arms 16 and 17 are identical to each other and only the first latch arm 16 will be described. The latch arm 16 has a pointed end 16A (see FIG. 3A), and an integral slot 16B having a roller 18 therein held in position by an axel 19.

Figure 3B:
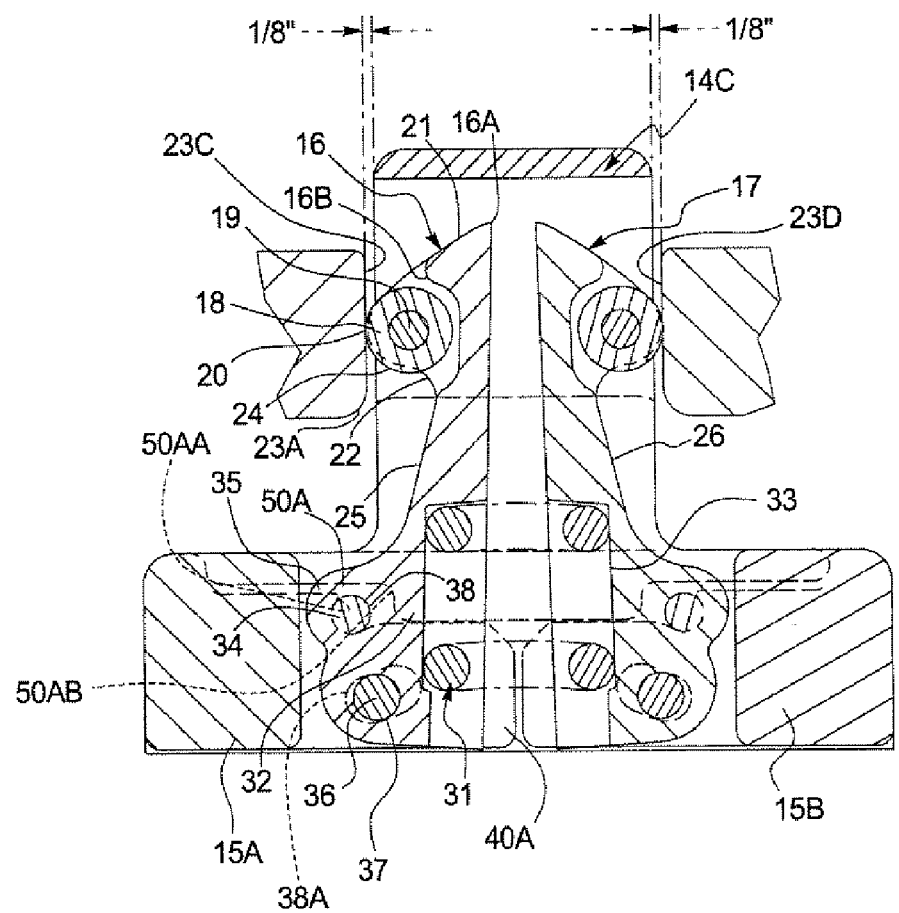
FIG. 3B is a partial sectional view similar to FIG. 3A but showing a position of latch arms of the container lock during insertion.

During insertion, as shown in FIG. 3B, at an upper camming surface 21 on the latch arm above the integral slot, a peripheral portion of the roller does not extend beyond the upper camming surface 21. Thus roller 18 does not initially participate in the camming action during insertion as surface 21 rides along wall 23C of the locking aperture at least until location 20 is reached where a peripheral portion of the roller just begins to protrude beyond the slot 16B.

Figure 3C:
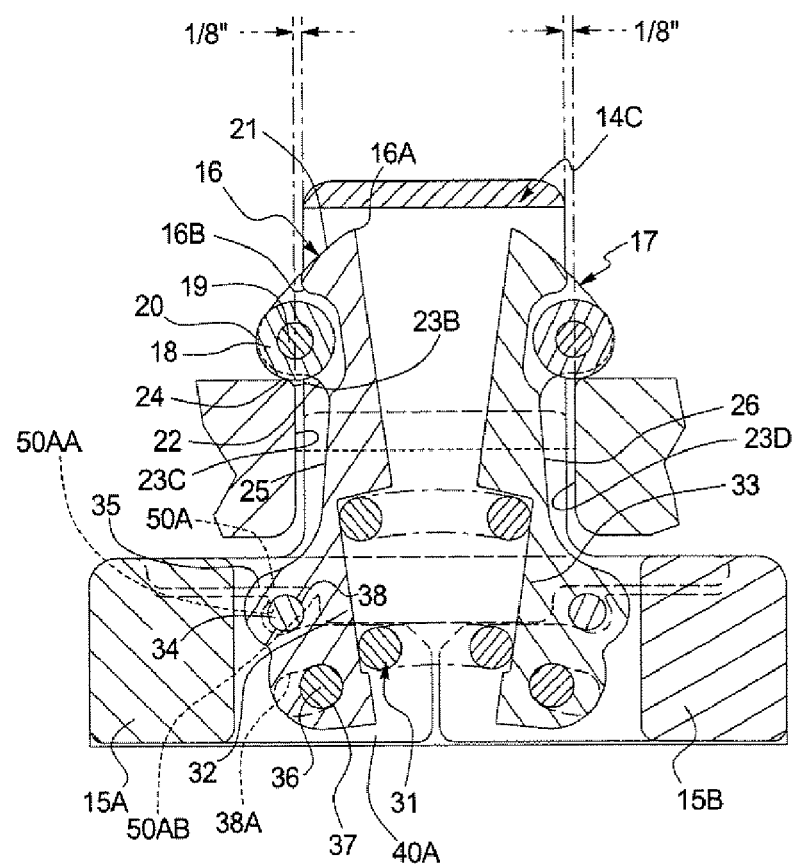
FIG. 3C is a partial sectional view similar to FIG. 3A but showing a position of the latch arms of the container lock during at least a beginning of extraction.

As shown in FIG. 3C, below point 20 at the integral slot a peripheral portion 24 of the roller 18 projects beyond the portion of the lower surface 22 beneath the slot so that the exposed peripheral portion 24 of the roller 18 can participate in the camming action during extraction. At point 20 the roller 18 is even with the slot outer surface. Thus this is the transition point for no further use of the roller 18 during extraction and where the camming surface 21 takes over.

To further explain, initially during insertion, the latch arms 16 and 17 are pushed inwardly as shown in FIG. 3B by the interaction of the upper camming surface 21 with a leading slanted edge 23A of the locking aperture 23 of the corner casting 8. During release or extraction of the container lock 12 from the respective locking aperture 23 of the corner casting 8 as shown in FIG. 3C, an inside slightly rounded corner 23B of the locking aperture 23 pushes against the peripheral camming portion 24 of the roller 18. This causes the latch arm to deflect inwardly beneath the archway of the post.

Given some wear over the life of roller 18, surface 22 may eventually come into contact and initially participate somewhat in the camming action along with the roller 18 during extraction.

Figure 4:
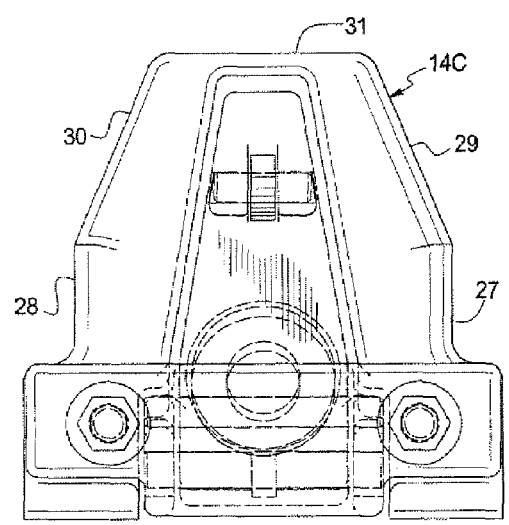
FIG. 4 is a side view of the container lock.
Figure 5:
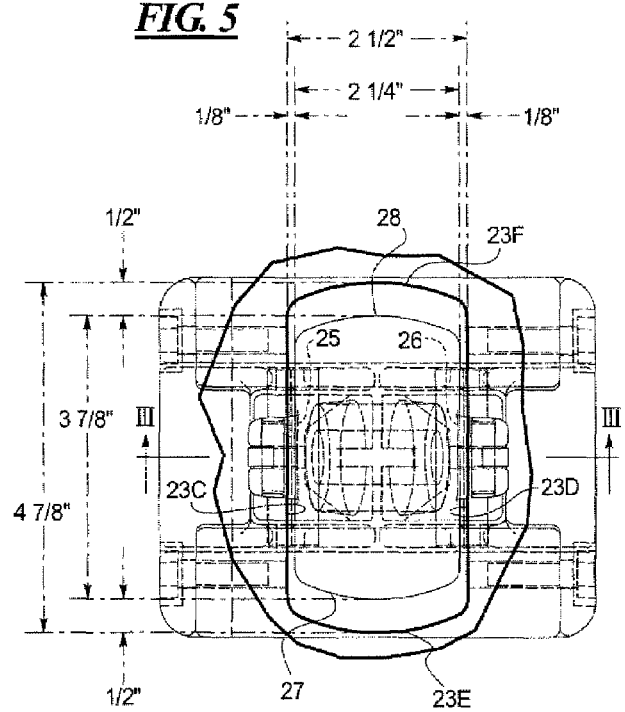
FIG. 5 is a top view of the container lock.

As shown most clearly in FIG. 2 and in the top view of FIG. 5, the longitudinal walls 23C and 23D of the locking aperture 23 of the corner casting 8 are spaced, for example at 2½", whereas sidewalls 25 and 26 of the post 14C are spaced at 2¼", so that a total of ¼" lateral clearance (⅛" on each side if centered) is present during insertion at these lateral sidewalls 25 and 26 of the post 14C. As also shown in FIG. 5, curved ends 23E and 23F of the locking aperture 23 each formed of a sector of a circle having a diameter of 4⅞" provide a total elongation distance of the aperture of 4⅞". This compares to a spacing of approximately 3⅞" of the longitudinal curved ends 27 and 28 (FIG. 4) of the post 14C so that the longitudinal clearance at each end, assuming longitudinal centering of the post in the aperture, is approximately ½". As shown in the side view of FIG. 4, these curved longitudinal ends 27, 28 merge into slanted respective end walls 29, 30 at both ends of the post 14C. These slanted ends merge into the top 31 of the archway of the post 14C.

The internal mechanism resulting in the spring loading movement of the latch arms can best be understood by viewing FIGS. 3A, B, C and 6.

A central compression spring 31 is provided in respective internal pockets 32 and 33 of each latch arm 16, 17 at the base thereof. The latch arm 16, for example, pivots about a respective first pivot pin 34 mounted in aperture 38 in a top of an ear portion 35 at a base of latch arm 16 and has its ends received in respective receiving cavities 50A (only one of the cavities 50A is shown in FIG. 3A). A lower portion of the cavity 50A is defined by dashed line 50AA with the pin 34 resting in the corner at 50AA. This surface is formed by a step-like cutout with a rounded portion for receiving pin 34 in a top surface of the flange 40A. A top of the cavity is defined by dash line 50AB which is a contour of a bottom surface of end portion 14A of the base 14. A second pivot pin 36 is provided passing through an aperture 37 in a bottom of ear portion 35 at a base of the latch arm 16 and having its ends received in respective slots 38A, 38B in the respective flange portions 40A and 40B of the end piece 15A (see also FIG. 6).

The dual pivot pin design of the preferred embodiment together with the use of a biasing spring 31 results in a greater extraction force with a container lock compared to its insertion force. This can be explained as follows. During insertion of the post 14C into the locking aperture 23 as shown in FIG. 3B, the first pivot pin 34 functions as the pivot point for the latch arm 16 and remains in a stationary position in the receiving cavities 50A while the second pivot pin 36 is not used for pivoting, but rather moves in an arc in the slots 38A, 38B as the latch arm rotates about the first pivot pin 34 (compare FIGS. 3A and 3B). Thus, the mechanical advantage provided by the mechanism is relatively small since the spring force acts on the latch arm only a short distance above the first pivot pin 34 and thus a smaller moment arm and less biasing force is provided at the roller 18 on the latch arm 16.

Conversely, during at least the beginning of extraction of post 14C from the corner casting locking aperture 23 as shown in FIG. 3C, the second pivot pin 36 is now the pivoting axis for the latch arm 16 and the first pivot pin 34 does not pivot but rather moves in an arc in the receiving cavities 50A somewhat away from the one corner at surface 50AA towards the other corner at surface 50AB as the latch arm 16 deflects. In this case, since the second pivot pin 36 lies substantially below the center of action of spring 31, this provides spring 31 with a greater moment arm on the latch arm 16 and thus has a greater mechanical advantage so that at the roller 18 on the latch arm 16, a greater biasing force is provided during extraction. During this operation at least at the beginning of extraction, the second pivot pin 36 remains at a fixed position within the guide slot 38A or 38B as the first pivot pin 34 moves in an arc somewhat away from the corner at lower bearing surface 50M somewhat toward the upper corner at upper bearing surface 50AB of the cavity 50A. After the beginning of extraction when roller 18 is now, for example, in the middle of the wall 23C of the locking aperture, the pin conditions exist as previously shown for insertion in FIG. 3B.

Operation of the container lock will now be described. First, let us assume that the post 14C is centered in the locking aperture 23 of the corner casting 8. Then as shown in FIG. 3A, ⅛" lateral clearance is provided at both sidewalls 25 and 26 of the post 14C. Since the greatest lateral extent at the roller of each latch arm is about 0.6" past the post sidewall 25 or 26 (see FIG. 3A), during insertion and/or extraction, the latch arm 16 is deflected inwardly by 0.6"−0.125"=0.475" (see FIGS. 3A and 3B). The same is true for the other latch arm 17. The total compression distance at least at the axis of the roller 18 is approximately double this amount or 0.95". However, if the post was entirely offset to one side of the locking aperture 23, then the latch arm 16 would be deflected by the distance 0.6"−0"=0.6" while the other latch arm 17 would be deflected by the distance 0.6"−0.25"=0.35". Although the latch arms 16 and 17 are deflected different distances, significantly the compression spring 31 is compressed at least at the top portion thereof, for example, by the same amount 0.95" as was the case given insertion of the post in a centered fashion. This has the significant advantage that regardless of whether or not the post 14C is centered or not during insertion in the locking aperture 23, the spring 31 is deflected the same amount, thus making it considerably easier to design the spring 31 to provide the proper biasing force on the two latch arms 16, 17, and that the biasing force is based on a certain pounds per inch spring rate. This makes it much easier for the force to be repeatable. Further, the use of the rollers on the latch arms also makes the extraction force of the post repeatable by reducing the effect of the sliding friction.

Thus, with the preferred embodiment a more reliable and predictable latching is accomplished by maintaining the same latch travel and reducing the dependence upon the force of friction and by being able to design the compression spring for a single travel distance, unlike the prior art where the spring travel distance would change if only a single latch arm is used, depending on the offset of the post into the locking aperture of the corner casting.

For the novel container lock of the preferred embodiment, the latching occurs laterally simultaneously, and even though the latch arms may swing different distances, the compression spring travel remain constant While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A container lock for insertion into a locking aperture, comprising:
   a post insertable into and extractable from the locking aperture;
   first and second latch arms within the post having a leading insertion end and projecting laterally from opposite sides of the post;
   the first and second latch arms each being pivotable about a first pivot axis during insertion and about a second pivot axis during at least a beginning of extraction, said first pivot axis being located between said leading insertion end and said second pivot axis; and
   a compression spring positioned between the latch arms.

2. A container lock of claim 1 wherein the compression spring is compressed a substantially same distance regardless of whether or not the post is centered with respect to the locking aperture during the insertion.

3. A container lock of claim 1 wherein the compression spring is positioned near one end of the latch arms.

4. A container lock of claim 1 wherein the compression spring is positioned such that a center of biasing force of the compression spring is above the first pivot axis.

5. A container lock of claim 1 wherein the first and second pivot axes each comprise pivot pins received in an ear portion at one end of the latch arms.

6. A container lock of claim 1 wherein the latch arms each have a roller at said insertion end.

7. A container lock of claim 1 wherein the latch arms have a camming end, and opposite the camming end an ear portion, said ear portion receiving first and second pivot rods, and wherein said spring is received in respective pockets of said latch arms in a region of said first pivot axis.

8. A container lock of claim 1 wherein the post comprises an arch and at a base of each leg of the arch are provided respective end portions.

9. A container lock of claim 8 wherein side pieces are attached to the end portions such that the end portions and the side pieces form a base.

10. A container lock of claim 9 wherein the side pieces each have parallel flanges forming a lower surface of a cavity for receiving a first pivot pin as said first pivot axis and having a slot for a second pivot pin as said second pivot axis.

11. A container lock of claim 1 wherein the first pivot axis comprises a first pivot pin received in a respective cavity at each end of the first pin and the second pivot axis comprises a second pivot pin having ends received in a respective slot.

12. A container lock of claim 1 wherein during the insertion, the latch arms pivot about said first pivot axis while said second pivot axis is retained in such a way that it can move in an arc, and during at least the beginning of the extraction, the latch arms pivot about said second pivot axis while said first pivot axis is retained in such a way that it can move in an arc.

13. A container lock of claim 1 comprising a railcar container lock.

14. A method for operating a container lock during insertion and extraction from a locking aperture, comprising the steps of:
   providing a post insertable into and extractable from the locking aperture, and providing first and second latch arms within the post each having a leading insertion end and projecting laterally from opposite sides of the post, the latch arms being pivotable about a first pivot axis during insertion and about a second pivot axis during at least a beginning of extraction, said first pivot axis being located between said leading insertion end and said second pivot axis, and wherein a compression spring is positioned between the latch arms;
   during the insertion pivoting the first and second arms about the first pivot axis while the second pivot axis moves laterally; and
   during at least the beginning of the extraction pivoting the latch arms about the second pivot axis while the first pivot axis moves laterally.

15. A method of claim 14 wherein during the insertion, the second pivot axis moves laterally in an arc, and during at least the beginning of the extraction the first pivot axis moves laterally in an arc.

16. A container lock for insertion into a locking aperture, comprising:
   a post insertable into and extractable from the locking aperture;
   first and second latch arms within the post each having a leading insertion end and projecting laterally from opposite sides of the post;
   the first and second latch arms each being pivotable about a first pivot pin during insertion and about a second pivot pin during at least a beginning of extraction, said first pivot axis being located between said leading insertion end and said second pivot axis, the first pivot pin being received at each end in respective first retaining regions allowing the first pivot pin to travel in an arc during at least the beginning of the extraction, and ends of the second pivot pin being received in respective second retaining regions to permit movement of the second pin in an arc during the insertion; and
   a compression spring positioned between the latch arms.

17. A container lock of claim 16 wherein the first retaining regions each comprise a cavity and the second retaining regions each comprise a slot.

18. A method for operating a container lock during insertion and extraction from a locking aperture, comprising the steps of:
   providing a post insertable into and extractable from the locking aperture, and providing first and second latch arms within the post each having a leading insertion end and projecting laterally from opposite sides of the post, the latch arms being pivotable about a first pivot axis during insertion and about a second pivot axis during at least a beginning of the extraction, said first pivot axis being located between said leading insertion end and said second pivot axis, wherein a compression spring is positioned between the latch arms, and wherein a roller is positioned near a camming end of each of the latch arms opposite an end where the compression spring is positioned;
   during the insertion pivoting the first and second arms about the first pivot axis while the second pivot axis moves in an arc;
   during at least the beginning of the extraction pivoting the latch arms about the second pivot axis while the first pivot axis moves in an arc; and
   wherein during at least the beginning of the extraction the roller on each latch arm assists in camming the latch arm inwardly towards the post to reduce friction with respective surfaces of the locking aperture.

* * * * *